United States Patent
Smoot et al.

(10) Patent No.: US 11,683,551 B2
(45) Date of Patent: Jun. 20, 2023

(54) SYSTEMS AND METHODS FOR DETECTING LIGHT SIGNATURES AND PERFORMING ACTIONS IN RESPONSE THERETO

(71) Applicant: Disney Enterprises, Inc., Burbank, CA (US)

(72) Inventors: Lanny S. Smoot, Thousand Oaks, CA (US); Michael Holton, Manhattan Beach, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 17/337,144

(22) Filed: Jun. 2, 2021

(65) Prior Publication Data
US 2021/0287030 A1 Sep. 16, 2021

Related U.S. Application Data

(63) Continuation of application No. 14/993,993, filed on Jan. 12, 2016, now Pat. No. 11,055,552.

(51) Int. Cl.
*G06F 16/33* (2019.01)
*G06T 7/00* (2017.01)
(Continued)

(52) U.S. Cl.
CPC ....... *H04N 21/42204* (2013.01); *G06F 3/033* (2013.01); *G06F 16/3331* (2019.01);
(Continued)

(58) Field of Classification Search
CPC .......... G07D 7/12; G07D 7/1205; G07D 7/00; A61B 5/0071; G06K 9/00577;
(Continued)

(56) References Cited

U.S. PATENT DOCUMENTS 3,059,064 A * 10/1962 Lebell .................. G09B 21/006
346/33 A
6,259,428 B1 * 7/2001 Ramchandani ........ H04N 1/622
345/589
(Continued)

FOREIGN PATENT DOCUMENTS

EP 0609008 A1 * 8/1994 ......... H04N 1/00846
JP 2002101313 A * 4/2002
(Continued)

OTHER PUBLICATIONS

Machine translation via SEARCH: Data Acquisition Using The Handheld Device From The Rendered Document of JP-2010-536188-A6 to King, retrieved Aug. 26, 2022, 132 pages. (Year: 2022).*
(Continued)

*Primary Examiner* — Matthew C Bella
*Assistant Examiner* — Dennis Rosario
(74) *Attorney, Agent, or Firm* — Farjami & Farjami LLP (57) ABSTRACT

There is provided systems and methods for performing actions based on light signatures. An exemplary system includes a light source, a light detector, a non-transitory memory storing a plurality of light signatures and a hardware processor. The hardware processor executes an executable code to illuminate, using the light source, a target object with a first light, collect, using the light detector, a second light being a reflection of the first light by the target object, match the second light with one of the plurality of light signatures, and perform an action in response to matching the second light with the one of the plurality of light signatures.

20 Claims, 8 Drawing Sheets

(51) Int. Cl.
| | |
|---|---|
| *G06F 3/033* | (2013.01) |
| *G06F 16/583* | (2019.01) |
| *H04N 21/422* | (2011.01) |
| *G06V 10/56* | (2022.01) |
| *G06V 10/60* | (2022.01) |
| *G06V 20/80* | (2022.01) |
| *G06V 30/142* | (2022.01) |
| *H04N 23/56* | (2023.01) |
| *G06V 10/22* | (2022.01) |
| *G06V 10/147* | (2022.01) |
| *G06V 10/145* | (2022.01) |
| *H04N 5/66* | (2006.01) |
| *H04N 5/60* | (2006.01) |
| *A63F 9/24* | (2006.01) |

(52) U.S. Cl.
CPC ........ *G06F 16/5838* (2019.01); *G06T 7/0002* (2013.01); *G06V 10/145* (2022.01); *G06V 10/147* (2022.01); *G06V 10/235* (2022.01); *G06V 10/56* (2022.01); *G06V 10/60* (2022.01); *G06V 20/80* (2022.01); *G06V 30/142* (2022.01); *H04N 23/56* (2023.01); *A63F 2009/2445* (2013.01); *H04N 5/602* (2013.01); *H04N 5/66* (2013.01)

(58) Field of Classification Search
CPC ........ G06K 9/2018; G06K 19/14; G06K 9/22; G06K 7/12; G06K 9/4652; G06K 7/10732; G06K 2019/06225; G06K 9/228; B42D 2033/20; B42D 2035/24; B42D 25/333; B42D 25/378; G06T 1/0021; G06T 1/0028; G06T 2201/0051; G06T 11/001; G06T 7/70; G06T 17/00; G06T 7/0004; G06T 7/521; G06T 7/0012; G06T 2207/30004; G06T 7/00; G06T 2207/10024; G06T 7/0002; G06T 7/001; G06T 7/0014; G01N 33/582; G01N 21/6456; G01N 2021/6439; G01N 2021/6417; G01N 21/251; G01N 21/64; G01N 21/6428; G01N 21/645; G01N 21/33; G02B 27/0172; G02B 27/0093; G02B 2027/0138; G06F 3/0304; G06F 3/04883; G06F 16/5838; G06F 3/01; G06F 3/017; G06F 3/03; G06F 3/0308; G06F 3/0317; G06F 3/0321; G06F 3/033; G06F 3/038; G06F 3/0383; G06F 3/0386; G06F 3/0354; G06F 3/03542; G06F 3/03545; G06F 16/30; G06F 16/33; G06F 16/3331; G06F 16/53; G06F 16/60; G06F 16/70; G06F 16/63; G06F 16/73; G06V 10/14; G06V 10/56; G06V 10/75; G06V 10/751; G06V 10/757
See application file for complete search history.

(56) References Cited

U.S. PATENT DOCUMENTS

| | | | |
|---|---|---|---|
| 2004/0023397 A1* | 2/2004 | Vig | G06K 19/14 436/1 |
| 2004/0156081 A1* | 8/2004 | Bril | G06K 19/06037 358/3.28 |
| 2005/0106547 A1* | 5/2005 | Chiu | G09B 5/062 434/317 |
| 2006/0115110 A1* | 6/2006 | Rodriguez | B41M 3/10 382/100 |
| 2008/0069423 A1* | 3/2008 | Liu | G06V 10/28 382/137 |
| 2008/0170269 A1* | 7/2008 | Kaneko | H04N 1/32144 358/3.28 |
| 2008/0310181 A1* | 12/2008 | Gurevich | G02B 6/0008 362/554 |
| 2013/0278425 A1* | 10/2013 | Cunningham | G08B 13/246 340/572.1 |
| 2014/0097359 A1* | 4/2014 | Vasic | G01J 1/58 250/206 |
| 2015/0118935 A1* | 4/2015 | Silver | A63H 3/14 446/484 |
| 2019/0094963 A1* | 3/2019 | Nijs | G09G 5/37 |

FOREIGN PATENT DOCUMENTS

| | | | |
|---|---|---|---|
| JP | 2010536188 A6 * | 10/2012 | |
| WO | WO-0114856 A1 * | 3/2001 | G01J 3/50 |

OTHER PUBLICATIONS

SEARCH Machine Translation:Image Processing Unit, Image Processing Method and Computer-Readable Recording Medium With Image Processing Program Recorded Therein of JP 2002-101313 A to Nobuhiro, retrieved Jan. 4, 2023, 19 pages. (Year: 2023).*

Tzeng, Spectral-based color separation algorithm development for multiple-ink color reproduction (Dissertation submitted Sep. 1999), Rochester Institute of Technology, PDF document created Oct. 4, 1999, uploaded Oct. 23, 2014, PDF document modified Jan. 11, 2000 [retrieved Apr. 22, 2023], 350 pages. (Year: 2023) Retrieved: https://www.researchgate.net/publication/34050991_Spectral-based_color_separation_algorithm_development_for_multiple-ink_color_reproduction (Year: 2023).*

* cited by examiner

SYSTEMS AND METHODS FOR DETECTING LIGHT SIGNATURES AND PERFORMING ACTIONS IN RESPONSE THERETO

The present application is a Continuation of U.S. application Ser. No. 14/993,993, filed Jan. 12, 2016, which is hereby incorporated by reference in its entirety into the present application.

BACKGROUND

Object recognition typically requires a camera for capturing an image of an object to identify the object by comparing various features of the captured images with features of various objects stored in a database. Other conventional methods of object recognition required a scanner for reading a one-dimensional (1D) or two-dimensional (2D) barcode affixed to an object. Recent advances in object recognition technology include three-dimensional (3D) object recognition, which enables object recognition based on a number of images taken of the object from a range of different angles. However, as the recent advances become more complex, the object recognition systems require more powerful processors, more complex algorithms, and, as a result, are more expensive.

SUMMARY

The present disclosure is directed to systems and methods for detecting light signatures and performing actions in response thereto, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
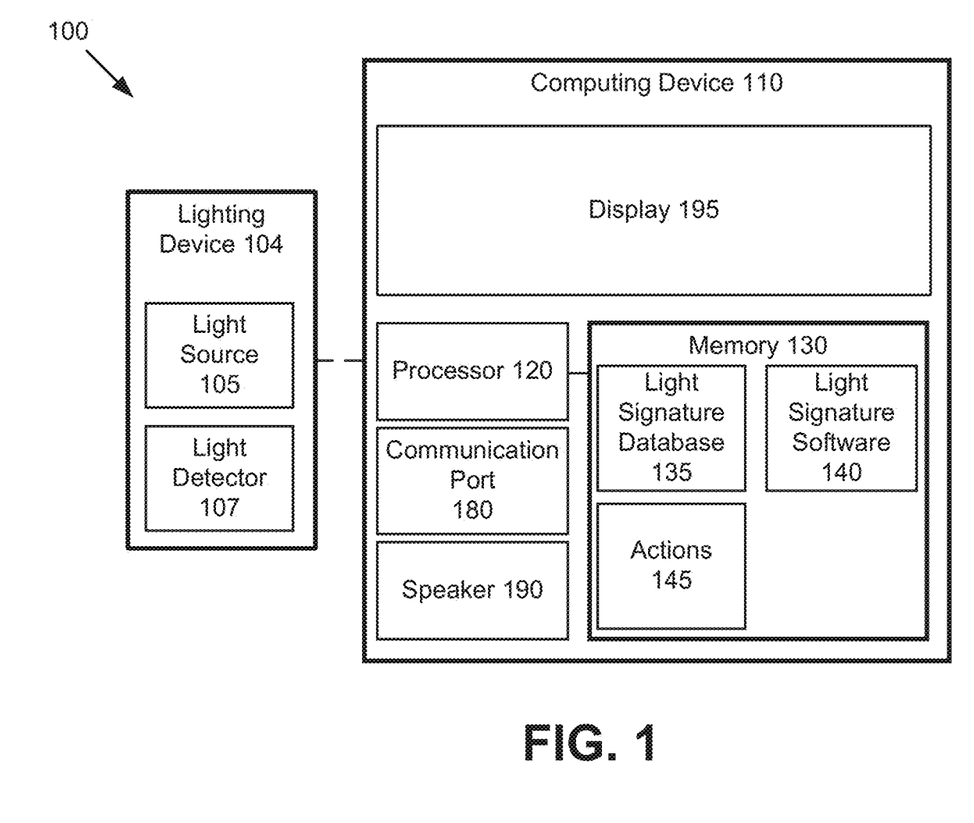
FIG. 1 shows a diagram of an exemplary system for identifying objects using light signatures, according to one implementation of the present disclosure.

FIG. 1 shows a diagram of an exemplary light signature system, according to one implementation of the present disclosure. Lighting system 100 includes lighting device 104 and computing device 110. Lighting device 104 includes light source 105 and light detector 107. Computing device 110 includes processor 120, memory 130, communication port 180, speaker 190, and display 195. Processor 120 is a hardware processor, such as a central processing unit (CPU) used in computing devices. Memory 130 is a non-transitory storage device for storing computer code for execution by processor 120, and also storing various data and parameters. Memory 130 includes light signature database 135, and light signature software 140. In some implementations, computing device 110 may be a smart device that is wirelessly connected to lighting device 104, such as a smart phone, a tablet computer, etc.

Lighting device 104 may be used to illuminate a target object (not shown) and collect light reflected by a surface of the target object. In some implementations, lighting device 104 may be a device that is physically separate from computing device 110 and may wirelessly connect to computing device 110. In other implementations, lighting device 104 may be incorporated in or physically integrated with computing device 110. Lighting device 104 includes light source 105 and light detector 107. Light source 105 may be any light generating device, such as a white light generator, a full spectrum light generator, one or more light emitting diodes (LEDs), one or more organic light emitting diodes (OLEDs), an infrared light generator, a near-ultraviolet light generator, an ultraviolet light generator, etc. In some implementations, light source 105 may include a white LED or a full spectrum light. In other implementations, light source 105 may include a red LED, a green LED, and a blue LED.

Light detector 107 is a device suitable for detecting light, such as a photo diode and/or a photo transistor. In some implementations, light detector 107 may include a white light detector or a full spectrum detector. In other implementations, light detector 107 may include a plurality of color detectors, such as a red light detector, a green light detector, and a blue light detector. Light detector 107 may be capable of measuring light energy, and may have a resolution of less than 1% for each color, making possible a red/green/blue (RGB) detection providing more than 100 possible identifiable red values, more than 100 possible identifiable green values, and more than 100 possible identifiable blue values.

Light signature database 135 stores a plurality of light signatures in memory 130. In some implementations, a light signature may include a color content of a light. In some implementations, light signature database 135 may be on a server that is connected to computing device 110 through a network, such as the Internet. Each light signature in light signature database may include a set of color values that describes a light, such as a light reflected by an object. Light signatures in light signature database 135 may include RGB light signatures, or light signatures other than RGB signatures, such as a light signature in cyan, magenta, yellow, and black (CMYK), etc. A light signature may be determined by measuring the light energy reflected by the target object or a target area of the target object. In some implementations, a light signature may be determined by measuring the light energy of a certain wavelength of light, or the light energy of a range of wavelengths of light.

Light signature software 140 is an executable code stored in memory 130 for execution by processor 120 to detect a light reflected by a target object using light detector 107, and match the detected light with one of the light signatures in light signature database 135. In some implementations, light signature software 140 may be on a server that is connected to computing device 110 through a network, such as the Internet. Light signature software 140 may include code for execution by processor 120 to turn on light source 105 to shine a light on a target object and may detect reflected light by the target object using light detector 107. In some implementations, light signature software 140 may determine the contents of the detected light, such as RGB values of the detected light, and match the RGB values with one of the light signatures in light signature database 135.

In response to matching the detected light by light detector 107 with one of the light signatures in light signature database 135, processor 120 may execute light signature software 140 for computing device 110 to take or perform one or more actions. The one or more actions may include playing a recorded content, such as recorded audio to be played using speaker 190 and/or recorded video to be played on display 195. For example, the one or more actions may include playing an audio pronouncing the words in the text of a book, where the audio is played when processor 120 matches a detected light reflected from a surface of a book, e.g., a picture in the book, with one of the light signatures in light signature data base 135. As another example, the one or actions may include playing an audio recording recorded by a parent of a child, such as the parent reading the text of the book for playback when the detected light reflected from a surface of a book, e.g., a picture in the book, matches one of the light signatures in light signature data base 135. The one or more actions may also include playing a sound effect, playing a song, or displaying graphics and/or video content on display 105, such as a picture or a video clip augmenting the contents of a book.

In some implementations, computing device 110 may include communication port 180 and may be connectable through wired connection or wireless connection with other devices, for example, lighting device 104. In some implementations, communication port 180 may be configured to receive a communication cable such as a universal serial bus (USB) port, Firewire port, Ethernet cable port, telephone cable port, HDMI port. In some implementations, communications port 180 can be configured to receive a transferable memory device, such as an SD card, mini SD card, micro SD card, USB memory device (thumb drive), a memory stick, or other configurations of transferable memory known in the art. In some implementations, communication port 180 may enable wireless communications, such that computing device 110 may be wirelessly connected to a computer, a computer network, or a device such as lighting device 104 using WiFi, cellular, Bluetooth®, or other wireless technologies known in the art. Communication port 180 may be used to update light signature database 135 to include newly added light signatures and/or update actions 145 with new actions, such as new audio and/or new video. In some implementations, such updates may be provided over a network, such as the Internet.

Figure 2:
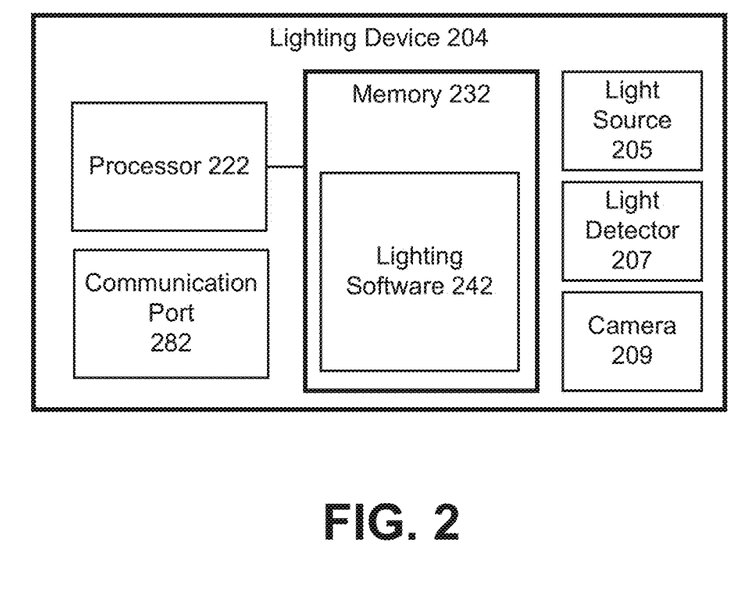
FIG. 2 shows a diagram of an exemplary lighting device for use with the system of FIG. 1, according to one implementation of the present disclosure.

FIG. 2 shows a diagram of an exemplary lighting device for use with the system of FIG. 1, according to one implementation of the present disclosure. As shown in FIG. 2, lighting device 204 may include light source 205, light detector 207, camera 209, processor 222, memory 232, and communication port 282. Processor 222 is a hardware processor, such as a central processing unit (CPU) used in computing devices. Memory 232 is a non-transitory storage device for storing computer code for execution by processor 222, and also storing various data and parameters. Memory 232 includes lighting software 242.

Light source 205 corresponds to light source 105, and light detector 207 corresponds to light detector 107. Additionally, lighting device 204 includes communication port 282, which may be used to connect lighting device 204 with computing device 110 via a wire or wirelessly. In some implementations, lighting device 204 may include camera 209, such as a digital camera. Lighting software 242 may utilize input from camera 209 to determine a direction of motion when lighting device 204 is moved across a surface, such as when lighting device 204 is slid across the surface of a target object, such as a page of a book. In some implementations, lighting software 242 may utilize input from camera 209 to determine a speed of motion when lighting device 204 is moved across a surface. Lighting software 242 is an executable code stored in memory 232 for execution by processor 222 to shine a light on a target object and detect reflection of the light by the target object, and determine or collect information about the color composition of the reflected light. Information about the color composition of the reflected light may include RGB color components of the reflected light. In some implementations, lighting software 242 may transmit the information about the reflected light to computing device 110 using communication port 282.

Figure 3A:
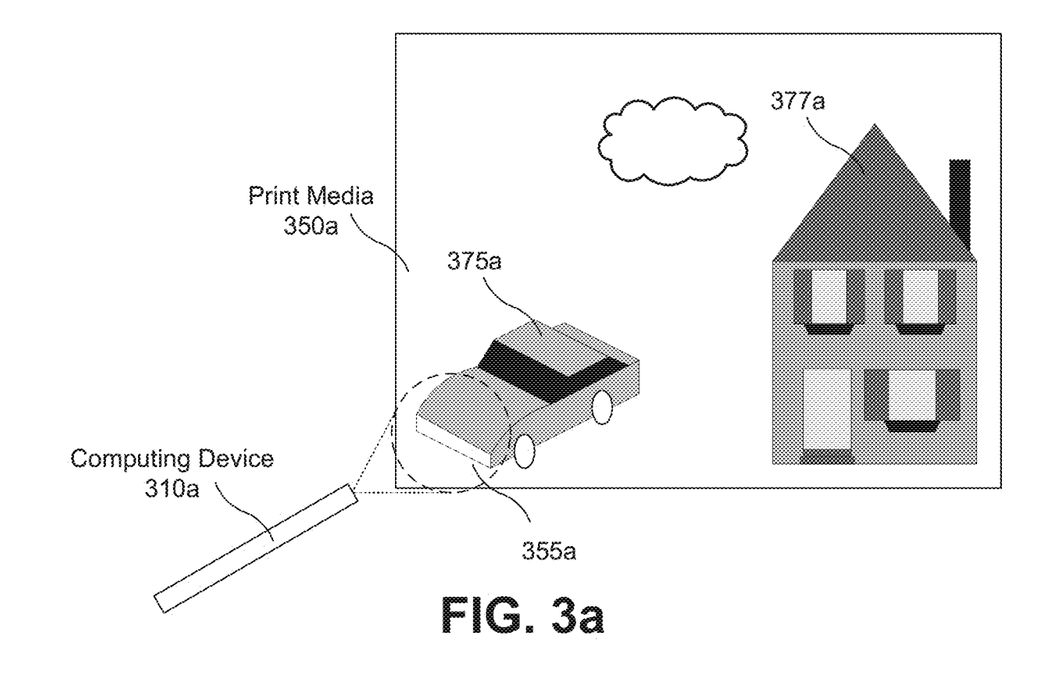
FIG. 3a shows a diagram of an exemplary utilization of the system of FIG. 1, according to one implementation of the present disclosure.

FIG. 3a shows a diagram of an exemplary utilization of lighting system 100 of FIG. 1, according to one implementation of the present disclosure. As shown in FIG. 3a, print media 350a includes a picture of car 375a located in the lower left-hand corner of print media 350a, and also house 377a located in the lower right-hand corner of print media 350a. Computing device 310a is depicted illuminating or shining light on target area 355a, in the lower left-hand corner of print media 350a. Computing device 310a may collect or detect light reflected by target area 355a, and determine the light signature of the collected light, as explained in conjunction with FIGS. 1 and 2.

In some implementations, computing device 310a may include a cone, light shield, or other opaque device to block ambient light, so that the collected light is substantially or mainly a reflection of the light generated by light source 105. In other implementations, computing device 310a may measure the ambient light before generating a light by light source 105, and then illuminate target area 355a using light source 105, collect the reflected light including ambient light and light from light source 105, and subtract the previously measured ambient light from the collected light to determine the light signature of target area 355a. In the example of FIG. 3a, in response to determining the light signature of target area 355a, computing device 310a determines that the light signature is associated with a car, such as a red car. Next, computing device 310a may play a recording that says "that's a beautiful red car; let's see if you can find a key for this car inside the house."

Figure 3B:
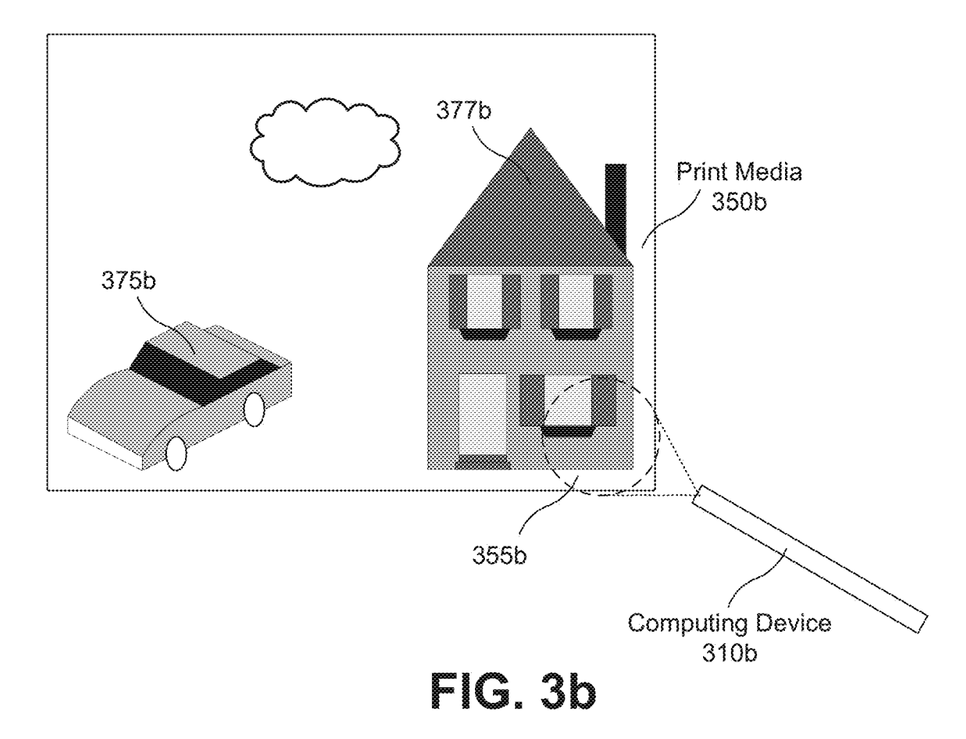
FIG. 3b shows a diagram of another exemplary utilization of the system of FIG. 1, according to one implementation of the present disclosure.

In other implementations, print media 350a may be printed using one or more fluorescent inks or dyes. In such an implementation, computing device 310a may illuminate target area 355a with one or more ultraviolet or near-ultraviolet lights. The fluorescent ink or dye may include fluorescent nano-materials, such as fluorescent nano-particles. The fluorescent ink or dye including nano-materials, when illuminated with an ultraviolet or near-ultraviolet light may reflect a light having a wavelength in the visible spectrum, such as red light, green light, and/or blue light. In one implementation, the ultraviolet or near-ultraviolet light may have a wavelength of about 300 nm to about 400 nm. Further, the fluorescent ink or dye may be printed in target area 355*a* of print media 350*a*, and may be invisible to the unaided human eye. FIG. 3*b* shows a diagram of another exemplary utilization of lighting system 100 of FIG. 1, according to one implementation of the present disclosure. As shown in FIG. 3*b*, print media 350*b* includes a picture of car 375*b* located in the lower left-hand corner of print media 350*b*, and also house 377*b* located in the lower right-hand corner of print media 350*b*. Computing device 310*b* is depicted illuminating or shining a light on target area 355*b*, in the lower right-hand corner of print media 350*b*. Computing device 310*b* may collect or detect light reflected by target area 355*b*, and determine the light signature of the collected light, as explained in conjunction with FIGS. 1 and 2.

In some implementations, computing device 310*b* may include a cone, light shield, or other opaque device to block ambient light, so that the collected light is substantially or mainly a reflection of the light from light source 105. In other implementations, computing device 310*b* may measure the ambient light before generating a light by light source 105, and then illuminate target area 355*b*, collect the reflected light, and subtract out the ambient light to determine the light signature of target area 355*b*. Note that the light signature of target area 355*b* will be different from the light signature of target area 355*a* due to the fact that the two target areas have unique colors or patterns. In the example of FIG. 3*b*, in response to determining the light signature of target area 355*b*, computing device 310*b* determines that the light signature is associated with a house, such as a window of the house. Next, computing device 310*b* may play a recording that says "congratulations, you found the car key inside the house." Similar to FIG. 3*b*, in other implementations, print media 350*b* may be printed using one or more fluorescent inks or dyes, where target area 355*b* may be illuminated with one or more ultraviolet or near-ultraviolet lights.

Figure 4A:
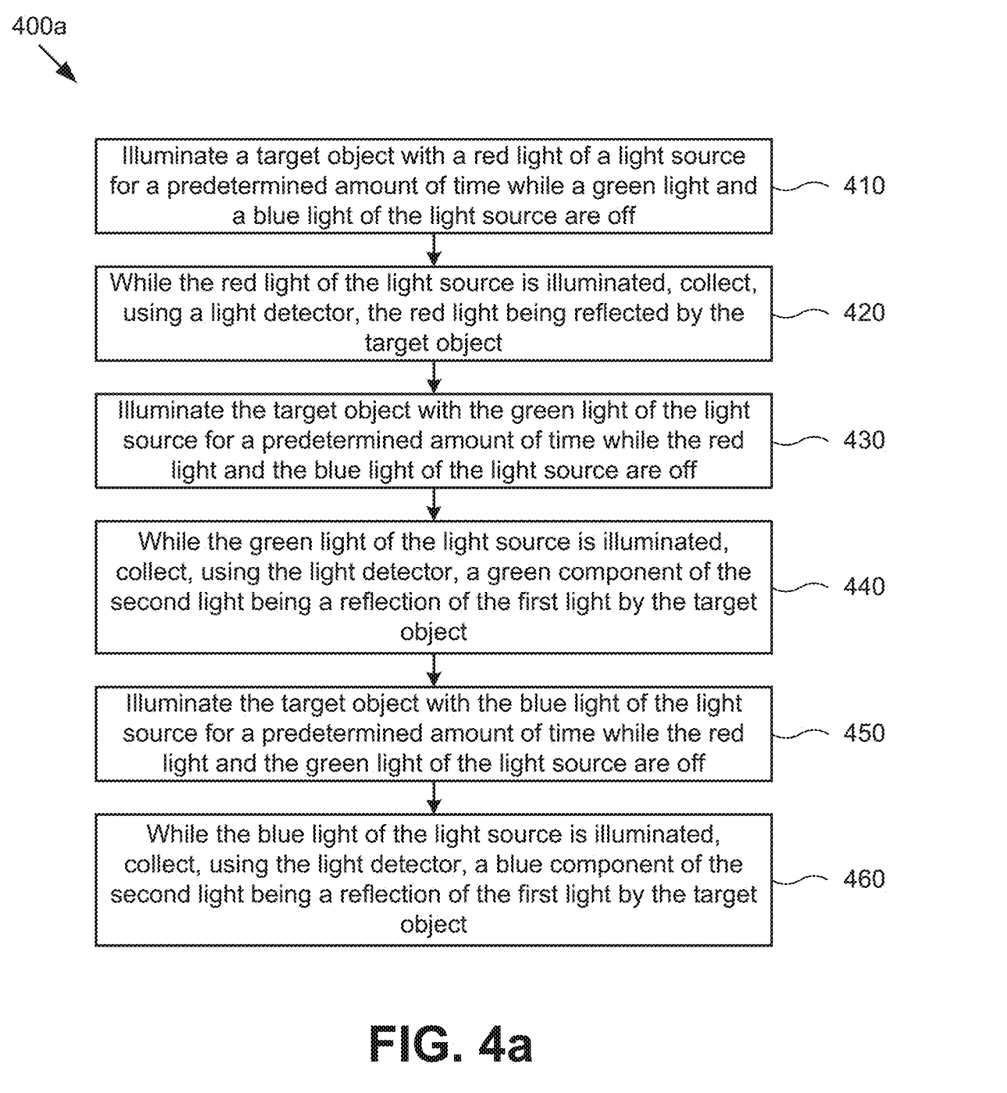
FIG. 4a shows a flowchart illustrating an exemplary method of illuminating a target object and collecting a light reflected by the target object using the system of FIG. 1, according to one implementation of the present disclosure.

FIG. 4*a* shows a flowchart illustrating an exemplary method of illuminating a target object and collecting a light reflected by the target object using the system of FIG. 1, according to one implementation of the present disclosure. Method 400*a* begins at 410, where lighting system 100 illuminates or shines a red light, using light source 105, on the target object. In some implementations, light source 105 may include a red LED, a green LED, and a blue LED and may shine the red LED on the target object while the green and blue LEDs remain off. Light source 105 may illuminate or shine the red light on the target object for a predetermined amount of time, such as a fraction of a second, e.g., a few milliseconds. At 420, while the red light of light source 105 is illuminated, light detector 107 collects or detects the red light that is reflected by the target object.

At 430, lighting system 100 illuminates or shines a green light, using light source 105, on the target object. In some implementations, light source 105 may shine the green LED on the target object while the red and blue LEDs remain off. Light source 105 may illuminate or shine the green light on the target object for a predetermined amount of time. At 440, while the green light of light source 105 is illuminated, light detector 107 collects or detects the green light that is reflected by the target object.

At 450, lighting system 100 illuminates or shines a blue light, using light source 105, on the target object. In some implementations, light source 105 may shine the blue LED on the target object while the red and green LEDs remain off. Light source 105 may illuminate or shine the blue light on the target object for a predetermined amount of time. At 460, while the blue light of light source 105 is illuminated, light detector 107 collects or detects the blue light that is reflected by the target object.

In some implementations, light source 105 may illuminate the target object or a portion of the target object, such as a target area. The target area may be a defined portion of the target object. For example, the target object may be a book including an image or a plurality of images. The target area may be defined as a portion of an image, such as the lower right-hand corner of the image, the lower left-hand corner of the image, the upper right-hand corner of the image, or the upper left-hand corner of the image. In other implementations, the target area may include a substantial portion of the target object. For example, the target object may be a trading card, and the target area may include a portion of the trading card up to the entire trading card.

In some implementations, the target area may include a target swath of the image, such that lighting device 104 must be moved to illuminate the target swath of the image by sliding lighting device 104 across the image. Lighting device 104 may utilize camera 209 to detect the direction and speed of motion when lighting device 104 slides over the image. In some implementations, the color signature of a target swath of the image may be stored in light signature database 135, and may include a dynamic light signature. The dynamic light signature may enable light signature software 140 to identify the light signature of the target swath of the image based on the proportional pattern of the light collected as lighting device 104 is slid over the target swath of the image.

Figure 4B:
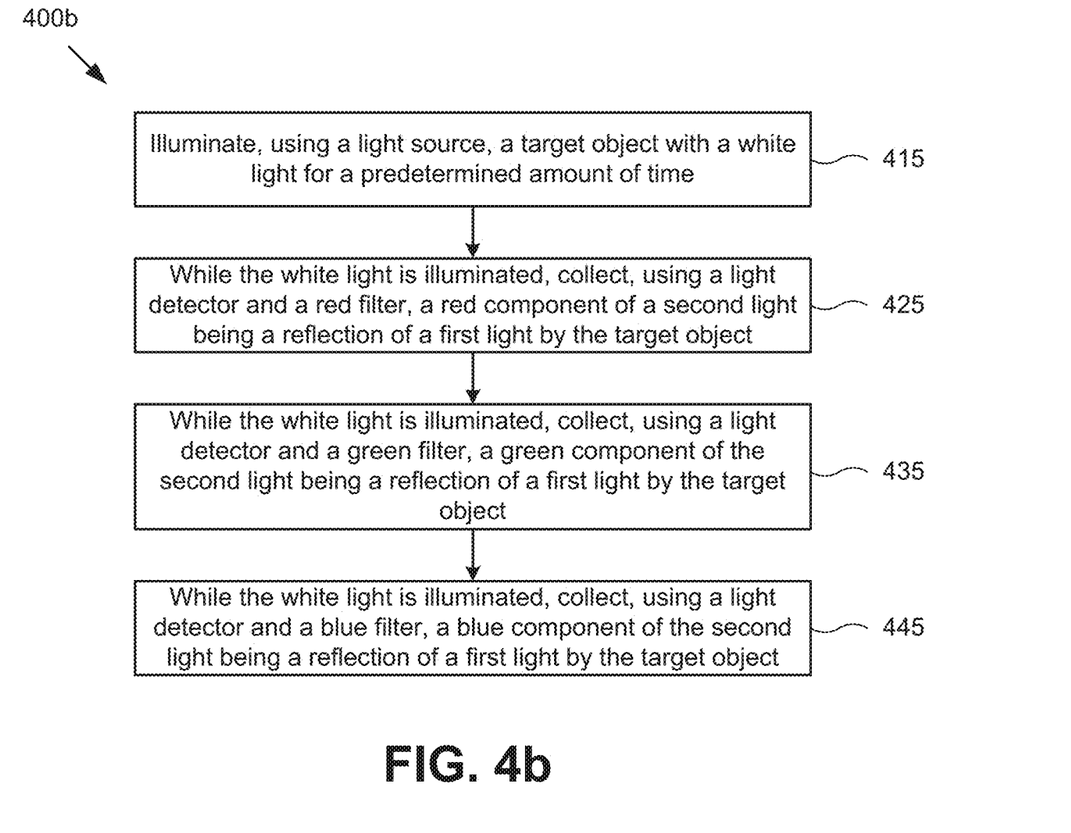
FIG. 4b shows a flowchart illustrating another exemplary method of illuminating a target object and collecting a light reflected by the target object using the system of FIG. 1, according to one implementation of the present disclosure.

FIG. 4*b* shows a flowchart illustrating another exemplary method of illuminating a target object and collecting a light reflected by the target object using the system of FIG. 1, according to one implementation of the present disclosure. Method 400*b* begins at 415, where lighting system 100 illuminates or shines a white light, using light source 105, on the target object for a predetermined amount of time, such as a fraction of a second, e.g. a few milliseconds. At 425, while the white light is illuminated, light system 100 collects or detects a red component of the white light being reflected off by the target object using light detector 107 and a red filter. The red filter may be a single color filter or a plurality of color filters sufficient to collect the red component of the light reflected by the target object. At 435, while the white light is illuminated, light system 100 collects or detects a green component of the white light being reflected off by the target object using light detector 107 and a green filter. The green filter may be a single color filter or a plurality of color filters sufficient to collect the green component of the light reflected by the target object. At 445, while the white light is illuminated, light system 100 collects or detects a blue component of the white light being reflected off by the target object using light detector 107 and a blue filter. The blue filter may be a single color filter or a plurality of color filters sufficient to collect the blue component of the light reflected by the target object.

Figure 5:
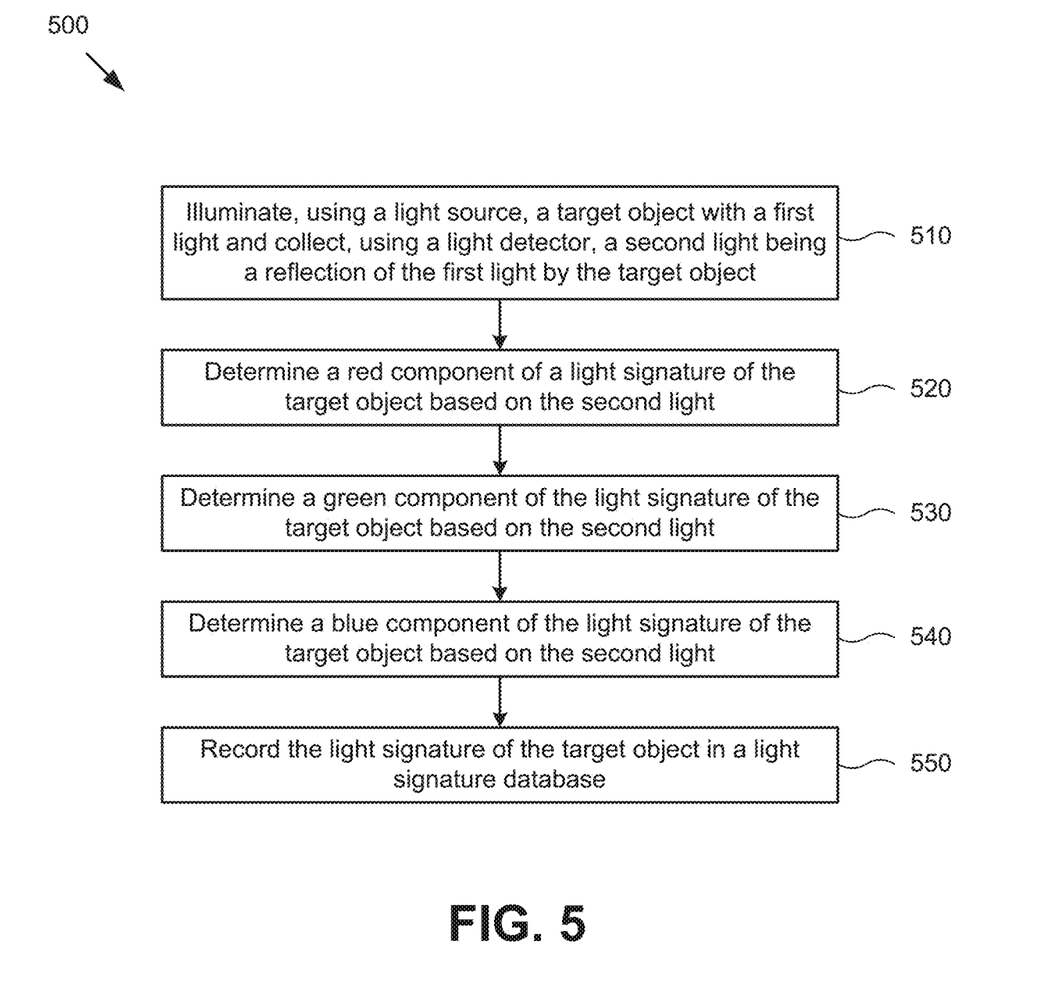
FIG. 5 shows a flowchart illustrating an exemplary method of recording a light signature of a target object using the system of FIG. 1, according to one implementation of the present disclosure.

FIG. 5 shows a flowchart illustrating an exemplary method of obtaining a light signature of a target object using lighting system 100 of FIG. 1, according to one implementation of the present disclosure. Method 500 begins at 510, where light lighting device 104 illuminates, using light source 105, a target object with a first light and collects, using light detector 107, a second light being a reflection of the first light by the target object as described in conjunction with either exemplary implementation in FIGS. 4a and 4b. In other implementations, the first light may include a light that is not within the visible spectrum, such as an ultraviolet light, a near-ultraviolet light, etc. In such an implementation, the second light may include a light emitted by a fluorescent pigment, fluorescent ink, fluorescent dye, and the like, which may be used in the target object. Light fluoresced by the target object may include light within the visible spectrum, such as a red light, a green light, and/or a blue light.

At 520, light signature software 140 determines a red component of a light signature of the target object based on the second light, as described in conjunction with FIGS. 1 and 2 above. In some implementations, light signature software 140 may determine the red component of the light signature for the second light by measuring the amount of red light collected by light detector 107, e.g., by measuring the amount of red light in the second light by measuring the energy or intensity of the red component of the second light. At 530, light signature software 140 determines a green component of the light signature of the target object based on the second light, as described in conjunction with FIGS. 1 and 2 above. In some implementations, light signature software 140 may determine the green component of the light signature for the second light by measuring the amount of green light collected by light detector 107, e.g., by measuring the amount of green light in the second light by measuring the energy or intensity of the green component of the second light. At 540, light signature software 140 determines a blue component of the light signature of the target object based on the second light, as described in conjunction with FIGS. 1 and 2 above. In some implementations, light signature software 140 may determine the red component of the light signature for the second light by measuring the amount of blue light collected by light detector 107, e.g., by measuring the amount of blue light in the second light by measuring the energy or intensity of the blue component of the second light.

In some implementations, the light reflected or fluoresced by the target object may have a unique light signature as a result of the colors of the target object. The colors of the target object may result from the colors, inks, paints, dyes, etc., used in creation of the target object, which may include one or more fluorescent compounds. Light signature software 140 may distinguish about 256 different values for each color. Values for each color, red, green, and blue, may range from zero to 255. As an example, light signature software 140 may determine the red component of the second light has a value of 10, the green component of the second light has a value of 180, and the blue component of the second light has a value of 210 resulting in an RGB light signature of (10,180,210) for the target object. Method 500 continues at 550, where light signature software 140 records the light signature of the target object in light signature database 135. In some implementations, light signature database 135 may be on a server, or light signature database 135 may be in memory 130. Storing the light signature of the target object in light signature database 135 may allow light system 100 to be updated with new light signatures.

Figure 6:
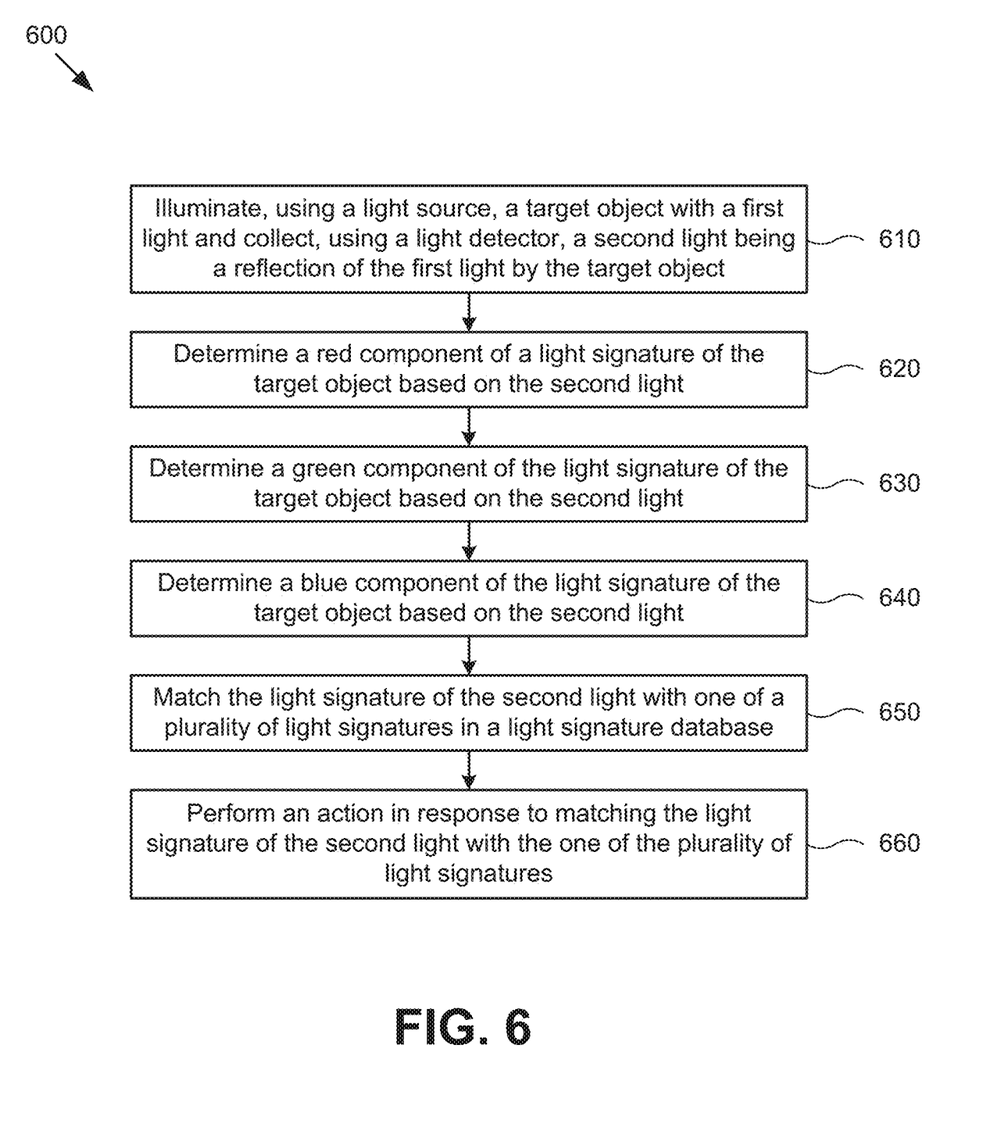
FIG. 6 shows a flowchart illustrating an exemplary method of performing an action based on a light signature obtained by the system of FIG. 1, according to one implementation of the present disclosure.

FIG. 6 shows a flowchart illustrating an exemplary method of obtaining a light signature of a target object using lighting system 100 of FIG. 1, according to one implementation of the present disclosure. Method 600 begins at 610, where light lighting device 104 illuminates, using light source 105, a target object with a first light and collects, using light detector 107, a second light being a reflection of the first light by the target object as described in conjunction with either exemplary implementation in FIGS. 4a and 4b. In other implementations, the first light may include a light that is not within the visible spectrum, such as an ultraviolet light. In such an implementation, the second light may include a light emitted by a fluorescent pigment, fluorescent ink, fluorescent dye, etc., which may be used in the target object. Light fluoresced by the target object may include light within the visible spectrum, such as a red light, a green light, and/or a blue light.

At 620, light signature software 140 determines a red component of a light signature of the target object based on the second light, as described in conjunction with FIGS. 1 and 2 above. In some implementations, light signature software 140 may determine the red component of the light signature for the second light by measuring the amount of red light collected by light detector 107, e.g., by measuring the amount of red light in the second light by measuring the energy or intensity of the red component. At 630, light signature software 140 determines a green component of the light signature of the target object based on the second light, as described in conjunction with FIGS. 1 and 2 above. In some implementations, light signature software 140 may determine the green component of the light signature for the second light by measuring the amount of green light collected by light detector 107, e.g., by measuring the amount of green light in the second light by measuring the energy or intensity of the green component. At 640, light signature software 140 determines a blue component of a light signature of the target object based on the second light, as described in conjunction with FIGS. 1 and 2 above. In some implementations, light signature software 140 may determine the red component of the light signature for the second light by measuring the amount of blue light collected by light detector 107, e.g., by measuring the amount of blue light in the second light by measuring the energy or intensity of the blue component.

In some implementations, the light reflected or fluoresced by the target object may have a unique light signature as a result of the colors of the target object. The colors of the target object may result from the colors, inks, paints, dyes, etc., used in creation of the target object, which may include one or more fluorescent compounds. Light signature software 140 may distinguish about 256 different values for each color. Values for each color, red, green, and blue, may range from zero to 255. As an example, light signature software 140 may determine the red component of the second light has a value of 10, the green component of the second light has a value of 180, and the blue component of the second light has a value of 210 resulting in an RGB light signature of (10,180,210) for the target object.

At 650, light signature software 140 matches the light signature of the second light with one of a plurality of light signatures in a light signature database. In some implementations, light signature software 140 may search a light signature database having a plurality of light signatures to find a match for the light signature of the second light. Light signature software 140 may search the light signature database to find a stored light signature that matches the light signature of the second light exactly, or light signature software 140 may search for a range of stored light signatures. For example, light signature software 140 may search the light signature database for a light signature that substantially matches the light signature of the second light, or for a range of light signatures that are within small percentage variance from the light signature of the second light.

This may accommodate small variations in colors due to differences in printing and/or fading or color changes due to age and exposure to light and air.

At 660, light signature software 140 performs an action in response to matching the second light with the one of the plurality of light signatures. In some implementations, an action may include playing an audio from actions 145 over speaker 190. In some implementations, the audio may be a pre-recorded audio provided by a content creator, such as an audio pronouncing the words in the text of a book that is provided by the book's publisher. In other implementations, the audio may include a message recorded by a user, such as an audio of a parent reading the text of a book that is recorded by the parent. An audio may also include additional information that may be provided as a supplement to a book. Actions 145 may also include playing a sound effect and/or a song from actions 145 on speaker 190, or playing a video from actions 145 on display 195.

From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a light source configured to emit a first light;
   a light detector;
   a non-transitory memory storing a plurality of light signatures; and
   a hardware processor configured to execute an executable code to:
      illuminate, using the first light emitted by the light source, an image on a page, wherein the page further includes text thereon, wherein the text is associated with a light signature included among the plurality of light signatures;
      collect, using the light detector, a second light being a reflection of the first light by the image;
      determine a light signature of the second light, the light signature of the second light including a first color component, a second color component, and a third color component;
      match the light signature of the second light with the light signature associated with the text, wherein the matching comprises searching for a range of light signatures that are within a small percentage variance of the light signature of the second light to accommodate small variations in color; and
      play a pre-recorded audio pronouncing words of the text on the page, in response to matching the light signature of the second light with the one of the plurality of light signatures associated with the text.

2. The system of claim 1, wherein the one of the plurality of light signatures includes a red value, a green value, and a blue value.

3. The system of claim 1, wherein the illuminating of the image includes sliding the light source over the image.

4. The system of claim 1, wherein the first color component is red, the second color component is green, and the third color component is blue.

5. The system of claim 1, further comprising:
   a camera;
   wherein the hardware processor is further configured to execute the executable code to:
      determine, using the camera, a direction of motion of the light source when the camera, the light source and the light detector move across a surface of the image.

6. The system of claim 1, wherein the image includes fluorescent ink invisible to an unaided human eye, wherein the fluorescent ink emits the second light that is visible when illuminated with an ultraviolet light.

7. The system of claim 1, wherein the light detector is configured to determine more than one hundred (100) possible values for each of the first color component, the second color component, and the third color component.

8. The system of claim 1, wherein the hardware processor is further configured to execute the executable code to measure an ambient light before the illuminating the image using the first light emitted by the light source;
   wherein the determining the light signature of the second light includes subtracting the ambient light from the collected second light.

9. The system of claim 1, wherein the matching includes matching both a first visible light and a second visible light of the second light with the one of the plurality of light signatures, the first visible light reflected in response to illuminating the image using an invisible light source, and the second visible light reflected in response to illuminating the image using a visible light source.

10. The system of claim 1, wherein the pre-recorded audio further includes a sound effect and/or a song.

11. A method for use with a system including a light source configured to emit a first light, a light detector, a non-transitory memory storing a plurality of light signatures, and a hardware processor executing an executable code to perform the method comprising:
    illuminating, using the first light emitted by the light source, an image on a page, wherein the page further includes text thereon, wherein the text is associated with a light signature included among the plurality of light signatures;
    collecting, using the light detector, a second light being a reflection of the first light by the image;
    determining a light signature of the second light, the light signature of the second light including a first color component, a second color component, and a third color component;
    matching the light signature of the second light with the light signature associated with the text, wherein the matching comprises searching for a range of light signatures that are within a small percentage variance of the light signature of the second light to accommodate small variations in color; and
    playing a pre-recorded audio pronouncing words of the text on the page, in response to matching the light signature of the second light with the one of the plurality of light signatures associated with the text.

12. The method of claim 11, wherein the one of the plurality of light signatures includes a red value, a green value, and a blue value.

13. The method of claim 11, wherein the illuminating of the image includes sliding the light source over the image.

14. The method of claim 11, wherein the first color component is red, the second color component is green, and the third color component is blue.

15. The method of claim 11, wherein the system includes a camera, and wherein the method further comprising:
   determining, using the camera, a direction of motion of the light source when the camera, the light source and the light detector move across a surface of the image.

16. The method of claim 11, wherein the image includes fluorescent ink invisible to an unaided human eye, wherein the fluorescent ink emits the second light that is visible when illuminated with an ultraviolet light source.

17. The method of claim 11, wherein the light detector is configured to determine more than one hundred (100) possible values for each of the first color component, the second color component, and the third color component.

18. The method of claim 11, wherein the hardware processor is further configured to execute the executable code to measure an ambient light before the illuminating the image using the first light emitted by the light source;
   wherein the determining the light signature of the second light includes subtracting the ambient light from the collected second light.

19. The method of claim 11, wherein the matching includes matching both a first visible light and a second visible light of the second light with the one of the plurality of light signatures, the first visible light reflected in response to illuminating the image using an invisible light source, and the second visible light reflected in response to illuminating the image using a visible light source.

20. The method of claim 11, wherein the pre-recorded audio further includes a sound effect and/or a song.

\* \* \* \* \*